United States Patent Office 3,321,864
Patented May 30, 1967

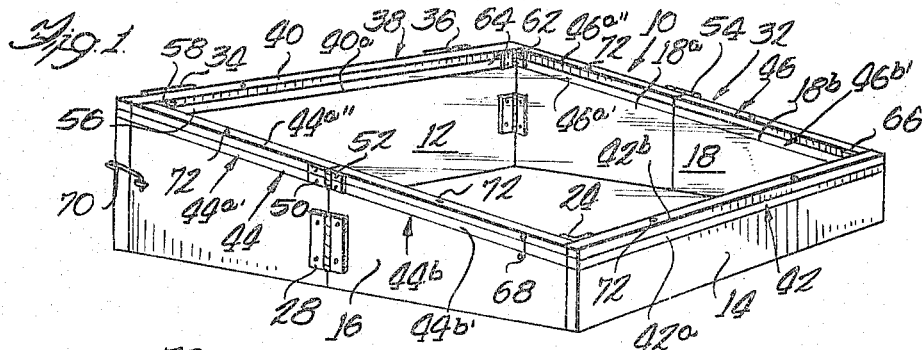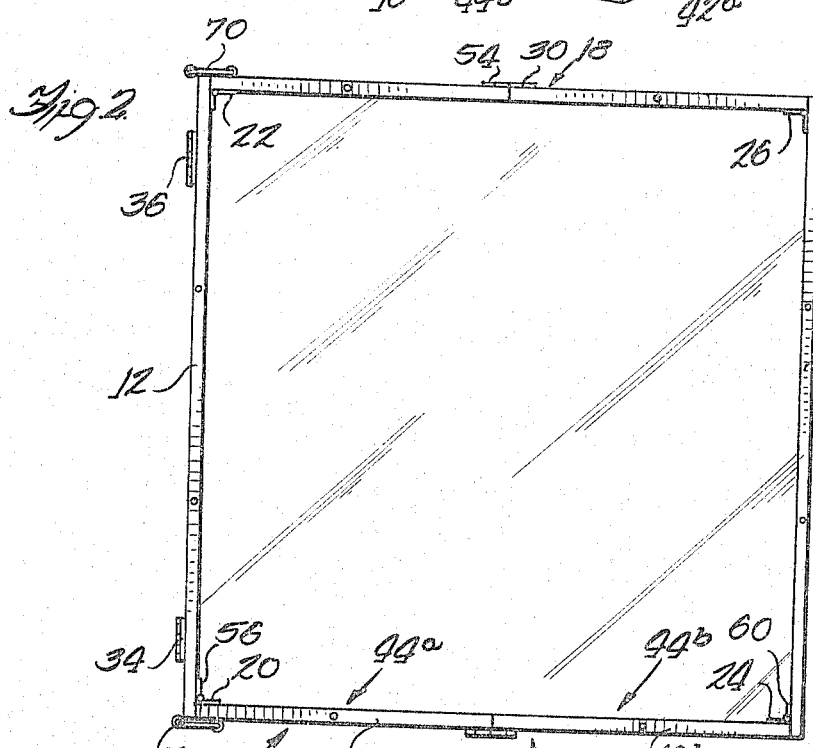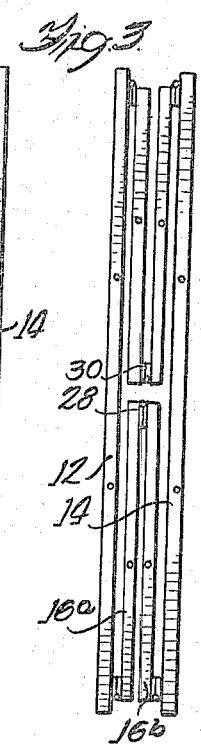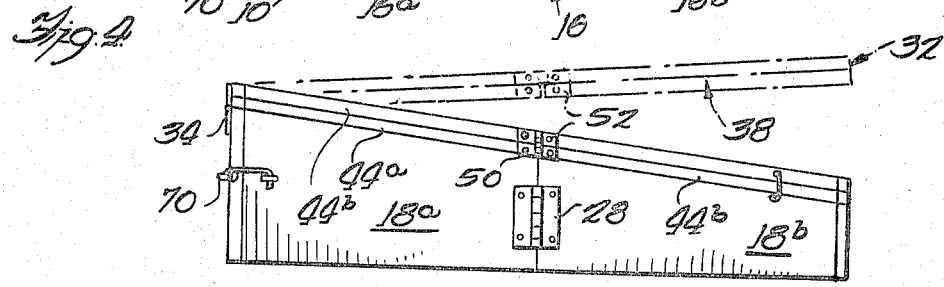

3,321,864
PROTECTIVE ENCLOSURE
William J. Stasiuk, Chicago, Ill.
(1690 State Line, Calumet City, Ill. 60409)
Filed July 6, 1964, Ser. No. 380,392
6 Claims. (Cl. 47—19)

This invention relates to protective enclosures and more particularly to a protective enclosure for seedlings, sets and the like, these enclosures being more commonly known as cold frames or hot beds.

It has previously been found to be desirable to construct a cold frame which may be folded for winter storage. Prior art cold frames of this type have been characterized by bulkiness and difficulty in handling. Furthermore, the prior foldable cold frames have been constructed of opaque material such as wood, or the like, with the result that seedlings or sets plated adjacent the walls had access to the rays of the sun only for a limited period of time in a day and only when the relative position of the sun had reached a predetermined high latitude.

A primary object of the invention is to provide a protective enclosure of the cold frame type which may be conveniently folded for compact winter storage and which is constructed of transparent material, such as polyethylene or the like, so that the entire enclosed area may receive the sun's rays, including ultra-violet rays, even when the sun is low on the horizon.

A further object of the invention is to provide a protective enclosure of the cold frame type which is characterized by ease and facility of manufacture and convenience of use.

These and other objects of the invention will be apparent as the description proceeds with reference to the accompanying drawing, in which:

FIGURE 1 is a view in perspective of a protective enclosure made in accordance with the present invention;

FIGURE 2 is a plan view of the protective enclosure of FIGURE 1;

FIGURE 3 is a plan view of the enclosure of FIGURES 1 and 2 in folded condition; and FIGURE 4 is a side elevational view of the enclosure of FIGURES 1, 2 and 3, showing the enclosure lid in elevated position.

Referring now to the drawing and more particularly to FIGURES 1 and 2, the protective enclosure of the present invention is indicated generally by reference numeral 10 and includes a back wall 12, a front wall 14, illustrated as being lower in height than the back wall 12, and side walls 16 and 18. The side walls 16 and 18 are hingedly connected to the back wall 12 by means of hinges 20 and 22, and to the front wall 14 by means of hinges 24 and 26.

According to an important feature of the present invention, the side wall 16 is divided into two sections 16a and 16b hingedly connected by hinge 28. In like manner, side wall 18 is divided into two sections 18a and 18b, hingedly connected by means of a hinge 30. Desirably, the walls 12, 14, 16 and 18 are formed of a suitable transparent material capable of transmitting all of the sun's rays, including ultra-violet rays. Preferably, these walls are formed of a semi-rigid plastic material such as polyethylene or the like.

The enclosure 10 is provided with a lid 32 which is connected to back wall 12 by means of hinges 34 and 36. The lid 32 comprises a frame, indicated generally by reference numeral 38 and having a member 40 overlying the back wall 12, a member 42 overlying the front wall 14, a member 44 overlying side wall 16 and a member 46 overlying side wall 18.

Side member 44 is divided into two articulated sections 44a and 44b which may be folded as illustrated in FIGURE 3. Section 44a has two superimposed portions 44a' and 44a'', while section 44b has two overlying sections 44b' and 44b''. Portions 44a' and 44b' are hingedly connected by hinge 50 while portions 44a'' and 44b'' are connected by hinge 52. In like manner member 46 is divided into articulated sections 46a and 46b which may be folded with respect to each other as illustrated in FIGURE 3. Section 46a has two superimposed portions 46a' and 46a''. Portions 46a' and 46b' are connected by a hinge (not shown) while portions 46a'' and 46b'' are connected by hinge 54, see FIGURES 1 and 2.

Portion 44a' of section 44 is connected to portion 40a by means of hinge 56 while portion 44a'' is connected to portion 40b by means of hinge 58. In like manner portion 44b' is connected to portion 42a by means of a suitable hinge (not shown) and portion 44b'' is connected to portion 42b by means of hinge 60.

Hinge 62 connects portion 40a with portion 46a' and portion 46b' is connected with portion 42a by a suitable hinge (not shown). Portion 40b is connected by means of hinge 64 to portion 46a'' and portion 46b'' is connected to portion 46b by means of hinge 66. When the enclosure is in the assembled position illustrated in FIGURE 1, relative movement of the lid with respect to the walls is precluded by latches 68, only one of which is shown. Between the portions of the several members of the frame of the lid 32 is secured the marginal edges of transparent sheet material 70 which may be of polyethylene or the like. The sheet 70 is retained in the position illustrated in FIGURE 2 by means of fastening elements 72.

The protective enclosure of the present invention exhibits important advantages over protective enclosures heretofore known. For instance, the present protective enclosure is completely transparent to beneficial rays of the sun and is readily foldable into the compact condition illustrated in FIGURE 3.

The above description is intended to be illustrative only. Applicant does not intend that he should be limited by the specific description above set out, but that his patent protection should be within the scope of the attached claims.

I claim:

1. An enclosure for protecting seedlings and the like from the weather comprising a back wall, a front wall, a pair of side walls each hingedly connected to said back wall and said front wall, each of said side walls comprising a pair of sections hingedly connected each to the other, and a lid hingedly connected to said back wall, said lid comprising a frame having members adapted to overlie each of said walls and adapted to move therewith, said lid being adapted to hold a sheet of transparent flexible material in stretched relation.

2. An enclosure in accordance with claim 1 wherein said walls are of transparent material.

3. An enclosure in accordance with claim 1 wherein said frame members are formed of two superimposed portions and wherein the upper portion is releasable secured to the lower portion and binds the sheet material therebetween.

4. An enclosure for protecting seedlings and the like from the weather comprising a back wall, a front wall, a pair of side walls having ends hingedly connected to said back wall and said front wall, each of said side walls having a pair of sections hingedly connected each to the other, a lid hingedly connected to said back wall and comprising a frame having members overlying said front wall, said back wall and said side walls, a sheet of transparent material mounted on said lid frame, the lid frame members overlying said side walls having hinged sections adapted to move with said side wall sections, all of said lid frame members having two overlying portions releasably secured each to the other and adapted to hold therebetween the marginal edges of said sheet material, whereby the enclosure may be folded to compact condition for storage by folding said side walls and said lid frame sections inwardly until they assume a position substantially parallel to and in limited spaced relation to said front and back walls.

5. An enclosure in accordance with claim 4 wherein said walls are transparent.

6. An enclosure in accordance with claim 4 wherein said walls and said lid frame are transparent.

References Cited

UNITED STATES PATENTS

| | | | |
|---|---|---|---|
| 1,100,273 | 6/1914 | Wiard | 200—2 |
| 1,954,674 | 4/1934 | Lager | 47—17 |
| 1,958,983 | 5/1934 | Albanese et al. | |
| 2,098,469 | 11/1937 | Smith | 20—2 |
| 2,691,848 | 10/1954 | Arena. | |

FOREIGN PATENTS

| | | |
|---|---|---|
| 374,104 | 6/1932 | Great Britain. |
| 535,869 | 4/1941 | Great Britain. |
| 640,518 | 7/1950 | Great Britain. |

ABRAHAM G. STONE, *Primary Examiner.*

R. E. BAGWILL, F. B. HENRY, *Assistant Examiners.*